(12) United States Patent
Miller et al.

(10) Patent No.: US 8,798,304 B2
(45) Date of Patent: Aug. 5, 2014

(54) ACOUSTIC VALVE MECHANISMS

(75) Inventors: Thomas E. Miller, Arlington Heights, IL (US); William A. Ryan, Elgin, IL (US); Joseph J. Heidenreich, Lake Zurich, IL (US); Ryan S. Scott, Gainesville, FL (US); Daniel Repplinger, Hawthorn Woods, IL (US); James Steven Collins, Elk Grove Village, IL (US)

(73) Assignee: Knowles Electronics, LLC, Itasca, IL (US)

( * ) Notice: Subject to any disclaimer, the term of this patent is extended or adjusted under 35 U.S.C. 154(b) by 708 days.

(21) Appl. No.: 12/963,289

(22) Filed: Dec. 8, 2010

(65) Prior Publication Data
US 2011/0129108 A1 Jun. 2, 2011

Related U.S. Application Data

(63) Continuation of application No. 12/574,832, filed on Oct. 7, 2009, now abandoned.

(60) Provisional application No. 61/165,746, filed on Apr. 1, 2009, provisional application No. 61/104,589, filed on Oct. 10, 2008.

(51) Int. Cl.
*H04R 11/04* (2006.01)
*H04R 25/00* (2006.01)
*H04R 1/32* (2006.01)

(52) U.S. Cl.
CPC ............. *H04R 1/326* (2013.01); *H04R 25/402* (2013.01); *H04R 25/456* (2013.01); *H04R 2460/11* (2013.01)
USPC ......................................... 381/356; 381/328

(58) Field of Classification Search
CPC .... H04R 1/326; H04R 25/402; H04R 25/456; H04R 2460/11; H04R 1/1041; F16K 3/0254
USPC ................ 381/123, 324, 327, 328, 330, 369, 381/355–361, 171, 177; 251/129.02, 251/129.17
See application file for complete search history.

(56) References Cited

U.S. PATENT DOCUMENTS

| 2,301,744 A | 5/1941 | Olsen |
| 3,835,263 A | 9/1974 | Killion |

(Continued)

FOREIGN PATENT DOCUMENTS

| CN | 1130459 A | 9/1996 |
| EP | 0455203 A2 | 11/1991 |

(Continued)

OTHER PUBLICATIONS

International Search Report and Written Opinion for PCT/US2009/059829, dated May 20, 2010.

(Continued)

*Primary Examiner* — Tuan D Nguyen
(74) *Attorney, Agent, or Firm* — Fitch, Even, Tabin & Flannery LLP

(57) ABSTRACT

A valve for a personal auditory system is described. The auditory system is capable of converting between an acoustic signal and an electrical signal. The auditory system has an acoustic pathway through which an acoustic signal may travel between a first point exterior to the auditory system and a second point interior to the auditory system. The valve includes a free floating electrode and a second electrode adjacent to free floating electrode. An electric signal that is generated by the second electrode moves the free floating electrode to substantially open or close the acoustic pathway.

3 Claims, 22 Drawing Sheets

(56) References Cited

U.S. PATENT DOCUMENTS

| | | |
|---|---|---|
| 3,836,732 A | 9/1974 | Johanson et al. |
| 3,975,599 A | 8/1976 | Johanson |
| 4,142,072 A | 2/1979 | Berland |
| 4,756,312 A | 7/1988 | Epley |
| 4,893,655 A | 1/1990 | Anderson |
| 5,259,035 A | 11/1993 | Peters et al. |
| 5,349,986 A | 9/1994 | Sullivan et al. |
| 5,524,056 A | 6/1996 | Killion et al. |
| 5,692,060 A | 11/1997 | Wickstrom |
| 5,757,933 A | 5/1998 | Preves et al. |
| 5,835,608 A | 11/1998 | Warnaka et al. |
| 5,990,425 A | 11/1999 | McSwiggen |
| 6,075,869 A | 6/2000 | Killion et al. |
| 6,134,334 A | 10/2000 | Killion et al. |
| 6,151,399 A | 11/2000 | Killion et al. |
| 6,876,749 B1 | 4/2005 | Killion et al. |
| 7,136,497 B2 | 11/2006 | McSwiggen |
| 7,458,395 B2 * | 12/2008 | Haynes et al. ........... 137/625.65 |
| 2006/0108552 A1 * | 5/2006 | Herbert et al. ........... 251/129.17 |
| 2006/0137934 A1 | 6/2006 | Kurth |

FOREIGN PATENT DOCUMENTS

| | | |
|---|---|---|
| KR | 10-0517059 B1 | 9/2005 |
| KR | 10/2008/0001568 A | 1/2008 |
| WO | WO9507014 A1 | 3/1995 |
| WO | 00-27166 A2 | 5/2000 |
| WO | 2006-061058 A1 | 1/2006 |
| WO | 2007-107736 A2 | 9/2007 |

OTHER PUBLICATIONS

European Search Report for PCT/US2009059829, dated Jul. 25, 2013, 8 pages.

* cited by examiner

14

14

| FRONT | SWITCH | REAR | Switch State |
|---|---|---|---|
| + | + | + | Undefined |
| + | + | - | CLOSED |
| + | - | + | Undefined |
| + | - | - | OPEN |
| - | + | + | OPEN |
| - | + | - | Undefined |
| - | - | + | CLOSED |
| - | - | - | Undefined |

ACOUSTIC VALVE MECHANISMS

CROSS REFERENCES TO RELATED APPLICATIONS

This application is a continuation of application Ser. No. 12/574,832 entitled "Acoustic Valve Mechanisms" and filed on Oct. 7, 2009, now abandoned which claims priority to U.S. Provisional Application No. 61/104,589 filed on Oct. 10, 2008 and entitled "Acoustic Switch Mechanism" and U.S. Provisional Application No. 61/165,746 entitled "Acoustic Valve Mechanism" and filed on Apr. 1, 2009 the contents of all of which are incorporated herein by reference in their entireties.

TECHNICAL FIELD

This patent application relates to acoustic valve assemblies which allow a vent to be created within an auditory system.

BACKGROUND OF THE INVENTION

Hearing aids use directional microphones to improve the signal to noise ratio in locations where there are multiple sources of sound. The most useful source of sound is generally in front of the listener. If there are not many sources of sound, or if the useful source is not in front of the listener, it is advantageous to change the microphone directionality. This is accomplished in current hearing instruments by using more than one microphone. Most designs use a matched pair of omni-directional microphones. The microphones must be very closely matched, or the electronics must be able to compensate for any differences between the microphones. This is difficult to accomplish, adds to the overall expense of manufacturing, and reduces the reliability of the hearing instrument. Another approach is to use one-directional microphone and one non-directional microphones. The drawback of this approach is that three microphone openings are required on the surface of the hearing instrument.

Receiver in Canal style hearing instruments are devices which are sold in open-fitting versions for people with mild impairment. The open fitting allows natural sound to reach the ear. This sound is supplemented by amplified high frequency sound from the hearing instrument receiver. The open fitting eliminates problems with occlusion, which makes the sound of chewing and one's own voice seem unnaturally loud. When the hearing instrument wearer is in a noisy environment, a closed fitting would be preferred. The closed fitting allows the instrument to have greater control over the sound to reach the ear. The closed fitting also offers increased directivity, noise reduction, and other features which increase intelligibility.

A need, therefore, exists for a hearing instrument which can provide the benefits of open and closed fitting.

BRIEF DESCRIPTION OF THE DRAWINGS

For a more complete understanding of the disclosure, reference should be made to the following detailed description and accompanying drawings wherein:

FIG. 27 is a table of open and closed positions based on polarity, for a switch mechanism according to the present invention.

Figure 1:
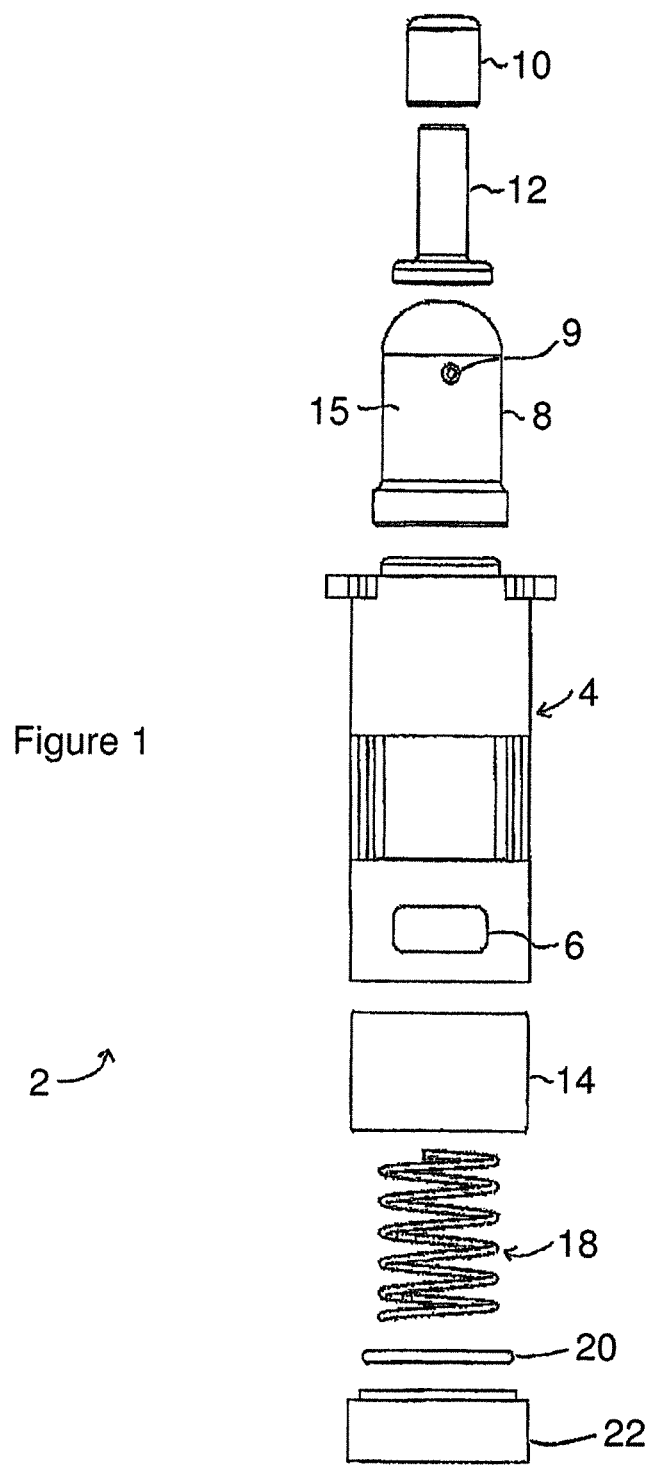
FIG. 1 is an exploded view of an acoustic vent assembly according to the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

While the present disclosure is susceptible to various modifications and alternative forms, certain embodiments are shown by way of example in the drawings and these embodiments will be described in detail herein. It will be understood, however, that this disclosure is not intended to limit the invention to the particular forms described, but to the contrary, the invention is intended to cover all modifications, alternatives, and equivalents falling within the spirit and scope of the invention defined by the appended claims.

The present invention generally relates to acoustic valve assemblies which may be part of auditory systems. The assemblies may be positioned within the auditory system, adjacent to a microphone/receiver, and between the speaker/microphone and the area outside the ear. Put another way, in an embodiment, the valve may be attached to the sealed back volume of a microphone. When the valve is open, the microphone will have a directional pattern. When the valve is closed, the pattern will be non-directional. Various methods are described below for actuation of the valve to create a vent within the auditory device or system, including mechanical actuation and electromagnetic actuation.

In an embodiment, a valve is provided for a personal auditory system. The auditory system may be capable of converting between an acoustic signal and an electrical signal. The auditory system has an acoustic pathway through which an acoustic signal may travel between a first point exterior to the auditory system and a second point interior to the auditory system. The valve has: a free floating electrode; a second electrode adjacent to free floating electrode; wherein an electric signal generated by the second electrode moves the free floating electrode to substantially open or close the acoustic pathway.

In an embodiment, the valve also has a third electrode, wherein the free floating electrode is positioned between the second electrode and the third electrode, wherein an electric signal generated by the third electrode moves the free floating electrode to substantially open or close the acoustic pathway.

In an embodiment, the valve is positioned within a microphone.

In another embodiment, a valve is provided for an auditory system. The auditory system may be capable of converting between an acoustic signal and an electrical signal. The auditory system has an acoustic pathway through which an acoustic signal may travel between a first point exterior to the auditory system and a second point interior to the auditory system. The valve has a housing; a magnetic member located within the housing capable of generating a magnetic force; an armature adjacent to the magnetic member wherein the magnetic member generates a magnetic force towards the armature; and a coil adjacent to the armature, wherein energizing of the coil attracts or repels the armature to substantially open or close the acoustic pathway.

In an embodiment, the valve also has a spring member associated with the armature, wherein the spring member applies a force to the armature to open the acoustic pathway.

In an embodiment, the valve also has a diaphragm coupled to the armature and positioned between the armature and the exterior of the auditory system wherein movement of the diaphragm opens or closes the acoustic pathway.

In yet another embodiment, a valve is provided for an auditory system. The auditory system may be capable of converting between an acoustic signal and an electrical signal. The auditory system has an acoustic pathway through which an acoustic signal may travel between a first point exterior to the auditory system and a second point interior to the auditory system. The valve has a magnetic member; and a coil substantially surrounding the magnetic member; wherein a magnetic field generated by the coil moves the magnetic member to substantially open or close the acoustic pathway.

In an embodiment, the magnetic member is positioned within a housing and the coil surrounds the housing.

In an embodiment, the housing has a port wherein movement of the magnetic member towards the port causes closing of the acoustic pathway.

In an embodiment, the valve also has a sleeve attached to the magnetic member.

In another embodiment, a valve is provided for an auditory system. The auditory system may be capable of converting between an acoustic signal and an electrical signal. The auditory system has a housing and further has an acoustic pathway through which an acoustic signal may travel between a first point exterior to the auditory system and a second point interior to the auditory system. The valve has a peg element fitted within the housing; a spring member coupled to the peg element wherein the spring member provides a restoring force to the peg element; and means for actuation of the peg element from a first position to a second position within the housing wherein such actuation substantially closes the acoustic pathway in the second position; and means for locking the peg element, or releasing the peg element, from the second position.

In an embodiment, the peg has a protruding member from a surface of the peg.

In an embodiment, the means for locking the peg element comprises a cam formed in the housing having a grooved surface sized to receive the protruding member.

In an embodiment, the acoustic pathway includes a port in the housing wherein the peg covers the port when the acoustic pathway is closed.

Mechanical Actuation

FIGS. 1-43

Figure 8:
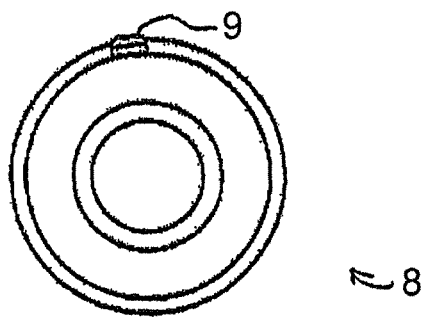
FIG. 8 is a top plan view of the peg element of FIG. 7.
Figure 7:
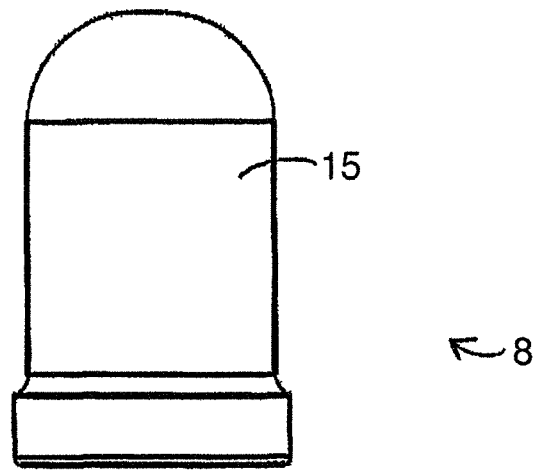
FIG. 7 is a side view of a peg element of the assembly of FIG. 1.

FIG. 1 illustrates a valve assembly 2 for creating a vent in an auditory system. The assembly 2 may have a housing 4 having apertures 6 through which, for example, air may enter or exit. Illustrated at an end of the housing 4 is a peg element 8 having a member or protrusion 9 extending from a surface of the peg element 8. FIGS. 7 and 8 provide side and top plan views of the peg element 8, which may be cylindrical in shape, although other shapes are possible as contemplated by those of skill in the art. Peg element 8 may be constructed of or coated in a soft, compliant material such as rubber or silicone to improve sealing with apertures 6. The inside of housing 4 may alternatively be coated in a soft material to aid sealing. The protrusion 9 may be integrally formed; or, in an embodiment, may be attached to a surface 15 of the peg element 8. A cap 10 and driver 12 are attached to the peg element 8. The cap 10 provides a point of contact for actuation of the assembly 2, as will be described in more detail below.

Figure 6:
FIG. 6 is a top plan view of the cam of FIG. 5.
Figure 5:
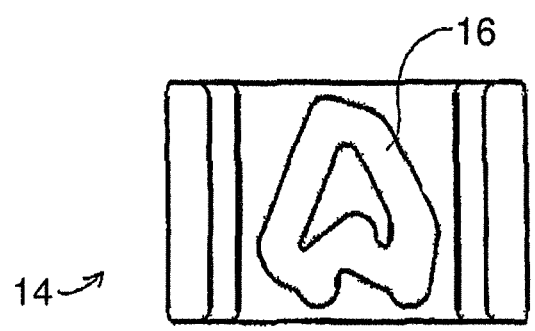
FIG. 5 is a side view of a cam component of the assembly of FIG. 1.
Figure 9:
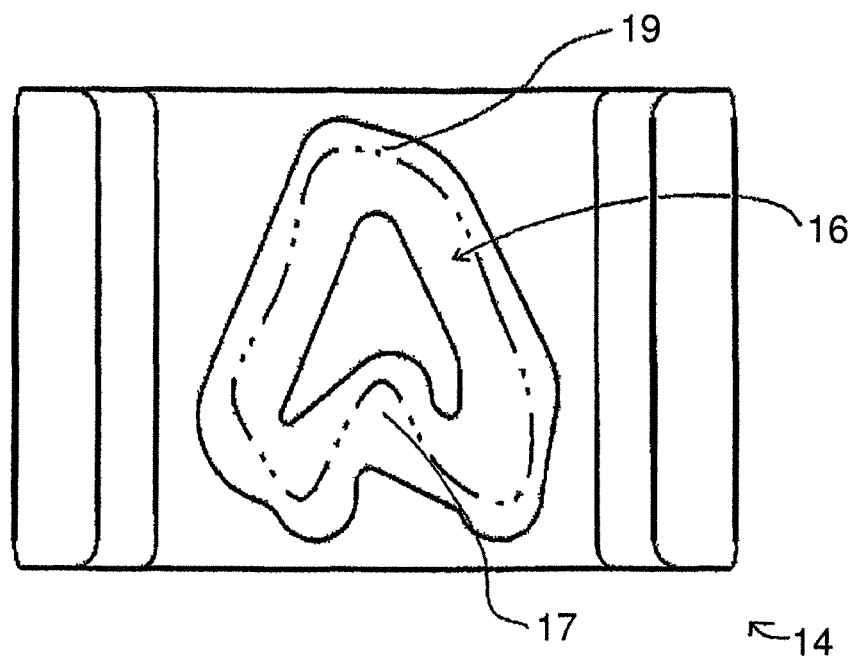
FIG. 9 is a close-up side view of the cam of FIG. 5.

A cam 14 is shown which fits concentrically around the peg element 8. FIGS. 5 and 6 provide side and top plan views, respectively, of the cam 14. As seen in FIG. 5, the cam 14 has a channel 16 which is shaped to receive the protrusion 9 of the peg element. The protrusion 9 may slide along the channel 16 as the vent 2 is actuated. Different points along the channel 16 may correspond to open or closed positions of the vent assembly 2. For example, and shown more closely in FIG. 9, location 17 may correspond to a closed position while location 19 may correspond to an open position. A spring 18 is located adjacent to the cam 14. An O-ring or seal 20 and a base 22 are adjacent to the spring 18.

Figure 2:
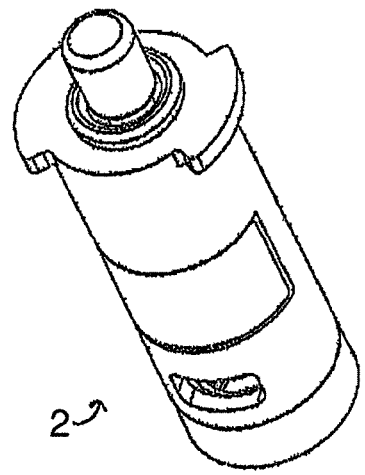
FIG. 2 is a perspective view of the assembly of FIG. 1.
Figure 3:
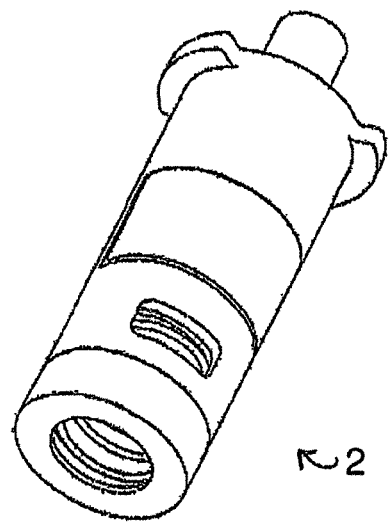
FIG. 3 is another perspective view of the assembly of FIG. 1.
Figure 4:
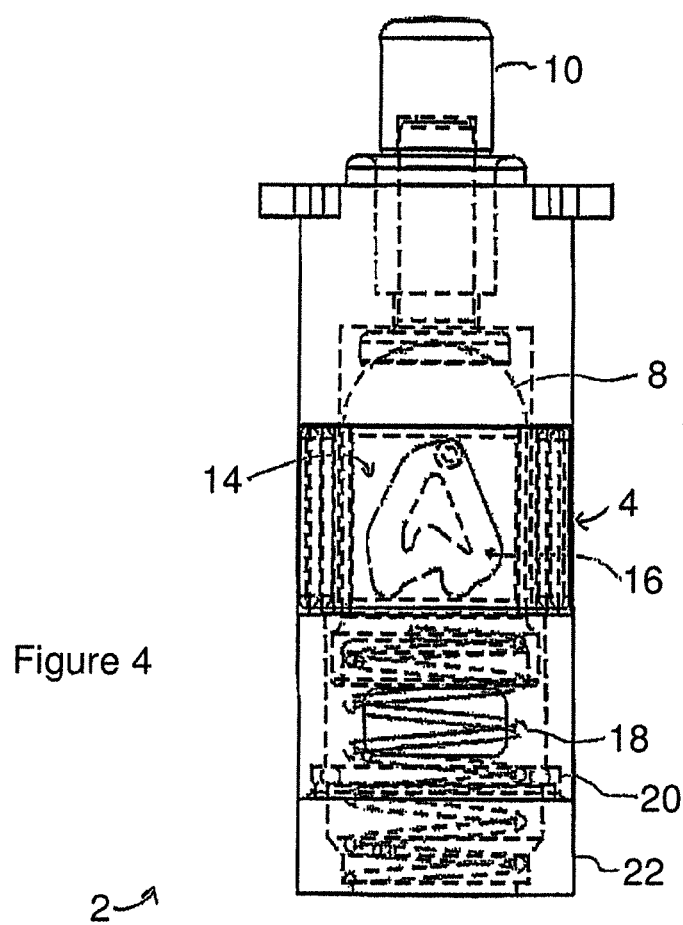
FIG. 4 is a transparent side view of the assembly of FIG. 1.

FIGS. 2 and 3 illustrate perspective views of the valve mechanism 2 in an assembled position. FIG. 4 provides a transparent side view of the assembly 2. As seen, the peg element 8 and cam 14 are concentrically positioned. The spring 18 is positioned below the cam 14. The driver 12 rests adjacent to the peg element 8 and moves the peg element 8 when the cap 10 is actuated. The components of the assembly 2 may be constructed from, for example metal, plastic, or the like. An overall length of the valve assembly 2 may be in a range from 0.01 inches to 0.5 inches. It should be noted that the materials and dimensions described herein are provided for purposes of example and should not be construed as limiting the scope of the invention.

Figures 10, 11:
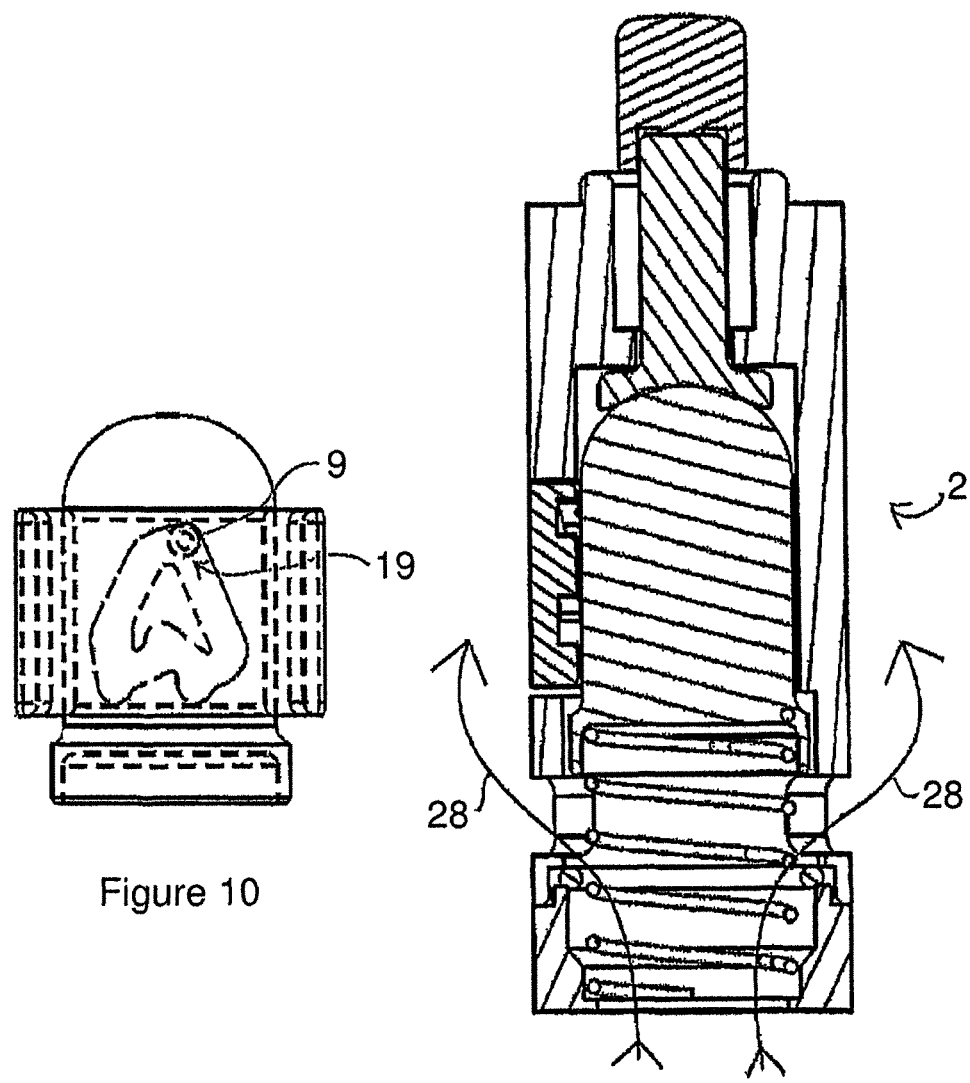
FIG. 10 is a side transparent view of the cam and peg element of the preceding figures in a position allowing a vent to be open.
FIG. 11 is a side transparent view of the assembly of FIG. 1 in an open position (i.e., in which the vent allows air to enter and exit)
Figure 12:
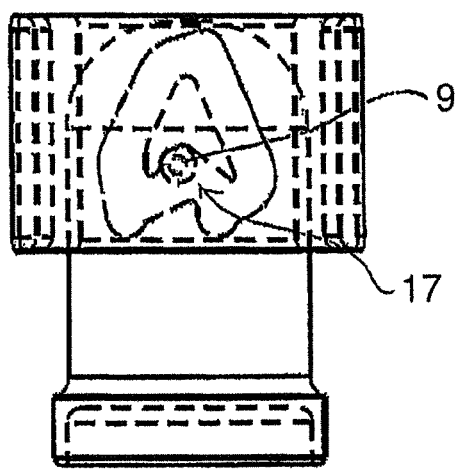
FIG. 12 is a side transparent view of the cam and peg element of the preceding figures in a position in which the vent is closed.
Figure 13:
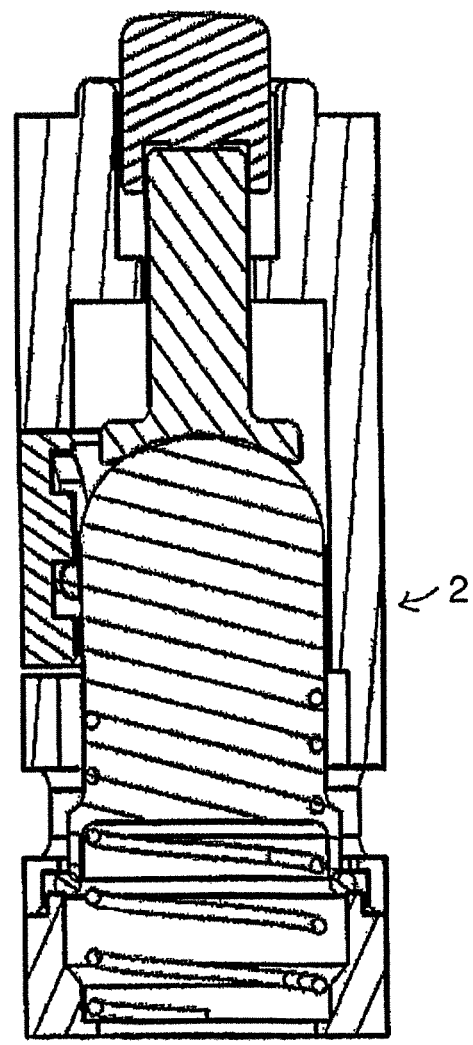
FIG. 13 is a side transparent view of the assembly of FIG. 1 in a closed position.
Figures 14A, 14B:
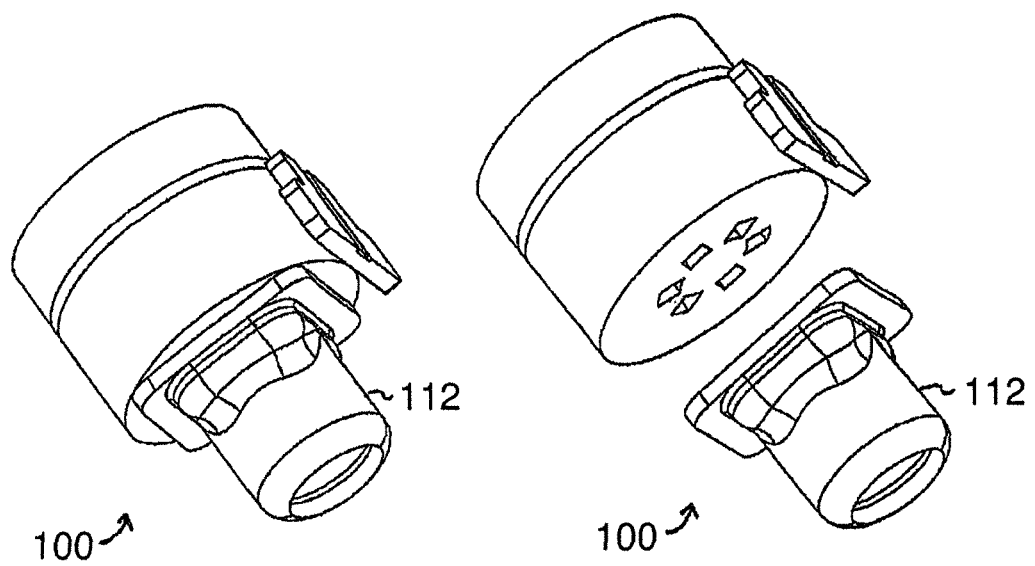
FIG. 14A is a perspective view of a magnetic valve assembly in an embodiment of the present invention.
FIG. 14B is an exploded view of the assembly of FIG. 14A.
Figure 15:
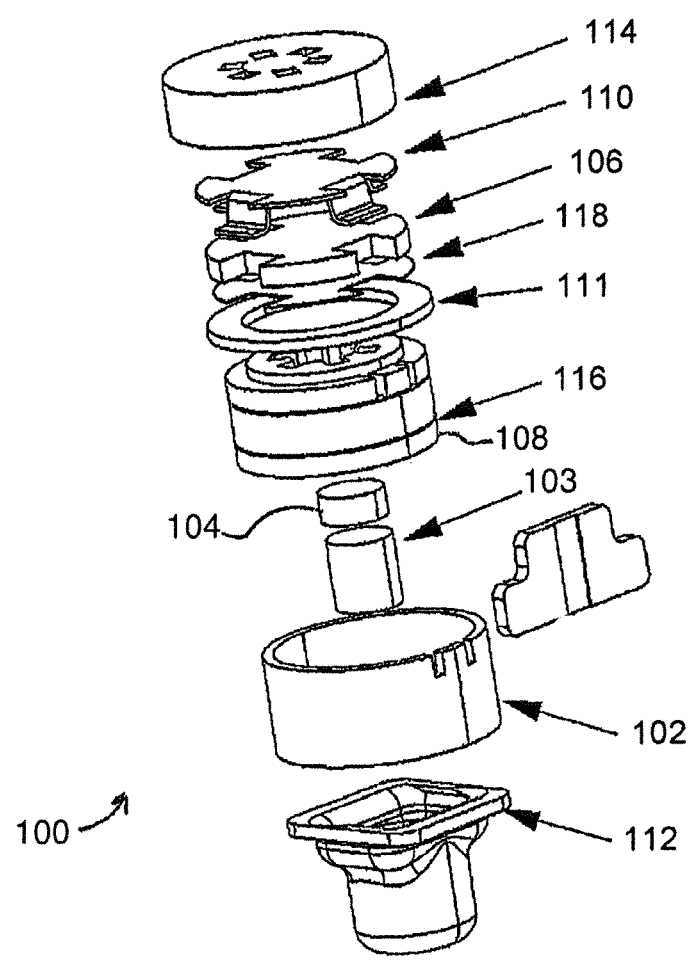
FIG. 15 is another exploded view of the magnetic valve assembly of FIG. 14A.

The positioning of the protrusion 9 along the channel 16 is dependent upon actuation of the cap 10. A first actuation (such as pressing down upon the cap 10) may move the protrusion 9 from location 19 to location 17 along the channel 16, thereby pushing the peg element 8 against the spring 18 and putting the assembly 2 in a closed position. A second actuation of the cap 10 may cause the spring 18 to place a force against the peg element 8 and subsequently move the protrusion 9 along the channel 16 back to location 19 where it is held in an open position. FIG. 10 provides an isolated view of the cam 14 and peg element 8 positioned whereby the protrusion 9 is at a location 19, which corresponds to the peg element 8 being above the apertures 6. Accordingly, because the peg element 8 is not covering the apertures 6, air or other fluids are allowed to vent, or flow, through the apertures 6, as shown by arrows 28 in FIG. 11. FIG. 12 provides an isolated view of the cam 14 and peg element 8 positioned whereby the protrusion 9 is at location 17, corresponding to a closed position, in which the peg element 8 covers the apertures 6. This is also illustrated in FIG. 13. Thus, fluid is not able to pass through the apertures 6.

Electromagnetic Actuation

FIGS. 14-24

In another embodiment, the valve can be magnetically powered, so that the valve position can be controlled by the electronics of the hearing instrument. The electronics in turn may be controlled by a remote control, or a processing unit may make decisions regarding the best valve setting based on the acoustic signals picked up by the microphones. The valve can be mounted directly to the microphone, or be connected through tubing. The magnetic motor is designed to be bistable, so that power is only consumed when the valve changes state. No power is required in between changes of state.

Embodiment 1

Moving Armature

Figures 16A, 16B:
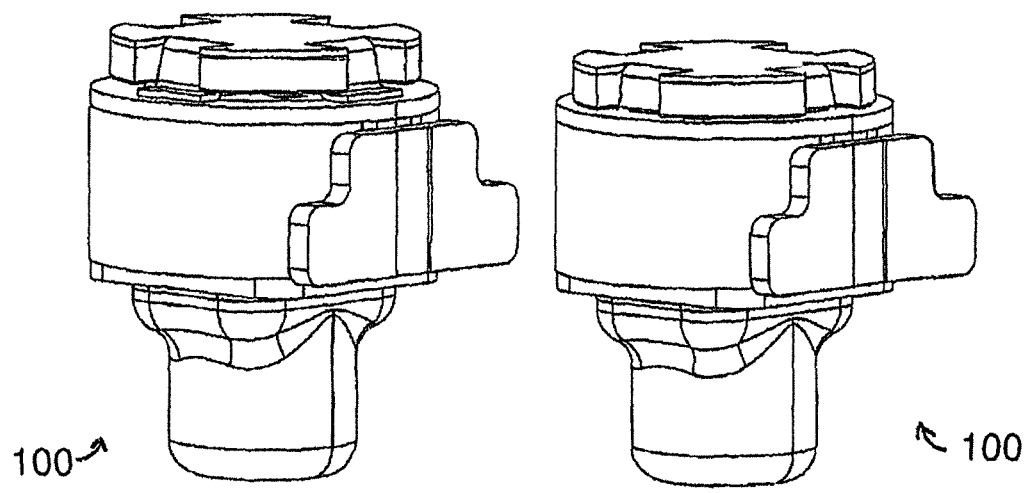
FIG. 16A is a perspective view of the valve assembly of FIG. 14A in an open state.
FIG. 16B is a perspective view of the valve assembly of FIG. 14A in a closed state.
Figure 17:
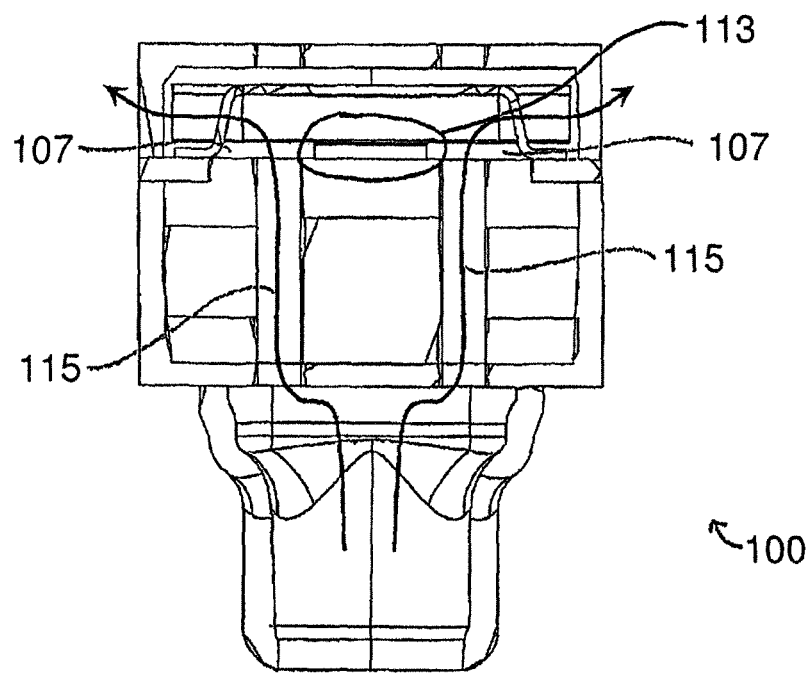
FIG. 17 is a cross-sectional view of the assembly of FIG. 14A in an open state.

In a first embodiment, illustrated in FIGS. 14-17, the magnetic design of the motor structure is similar to a "button" receiver used in prior art hearing instruments. The magnetic assembly 100 is made up of the cup 102, pole piece 103, magnet 104, top plate 111, magnet 104 and armature 106. The cup, pole piece and top plate are made of high permeability soft magnetic material, such as 50% iron/nickel alloy. For high efficiency, the motor provides a closed magnetic circuit. The magnetic flux flows in a path from the magnet 104, through the pole piece 103, cup 102, and top plate 111. From there, the flux crosses an outer air gap (not identified in drawing) to the armature 106, travel through the armature, and cross an inner air gap to return to the magnet 104. The magnetic reluctance depends on a size of an inner air gap 113 and/or outer air gap 107 between the magnet 104 and armature 106, and the cup 102 and armature 106. The air gap 107 is best seen in FIG. 17, between armature 106 and magnet 104 in the center of FIG. 17, and between the cup 102 and armature 106 at left and right edges of the figure. The top plate 111 increases the magnetic surface area between the armature 106, cup 102 and magnet 104, thus reducing the magnetic reluctance.

The armature 106 is held away from a bobbin 108 by a spring 110, thereby keeping the valve in an open position. Air can flow through the tube 112, bobbin 108 and out through the cover 114. If the coil 116 is energized, the armature 106 will move toward the bobbin 108. Once it reaches the bobbin 108, the armature 106 will be attracted to the magnet 104. The attraction will, most likely, overcome the stiffness of the spring 110, thereby holding the valve in a closed position. A gasket material 118 can be incorporated to improve an air tight seal of the valve. If a reverse current is applied to the coil 116, it will reduce the magnetic field from the magnet 104, allowing the spring 110 to return the armature 106 to the open position. FIG. 16A shows the assembly 100 in an open state; shown more closely in FIG. 17 and indicated by arrows 115, whereby air is allowed to travel through the assembly 100. FIG. 16B shows the assembly 100 in a closed state.

To reduce the current requirements of the coil signal, a small circuit may be incorporated with the valve. The circuit would, most likely, accept a continuous low power logic signal from the hearing instrument electronics, and convert the signal into short pulses required to operate the valve.

Embodiment 2

Figure 18:
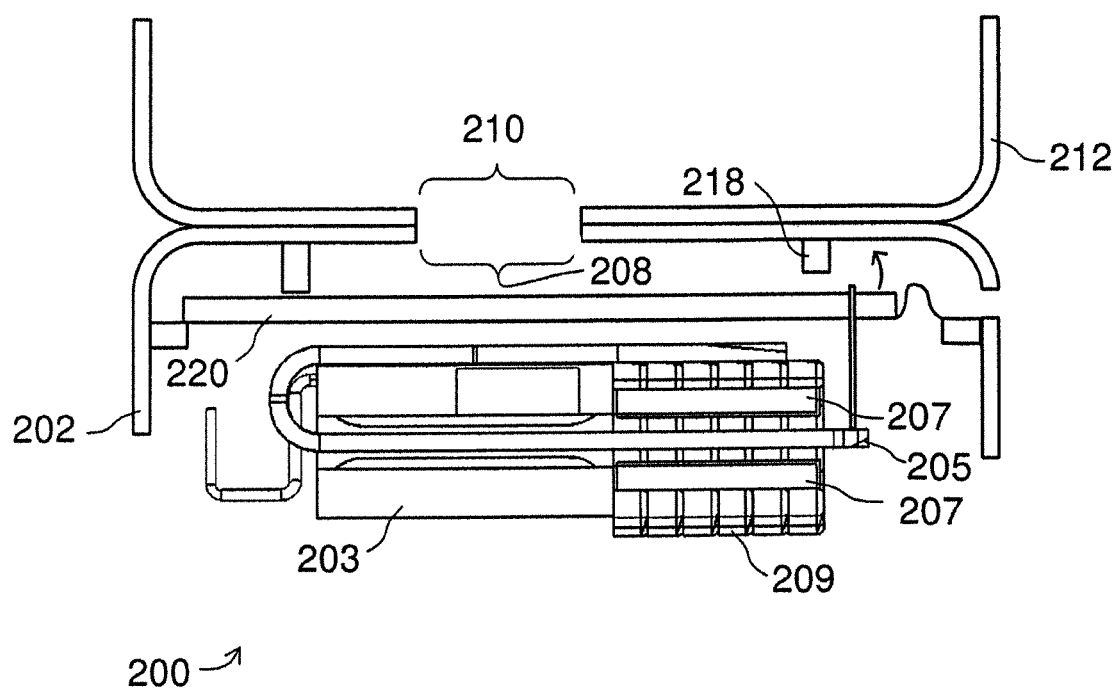
FIG. 18 is an isolated view of a valve assembly utilizing a balanced armature receiver as the valve in an embodiment of the present invention.

In another embodiment, shown in FIG. 18, an assembly 200 utilizes a balanced armature receiver 202 as the valve. The receiver 202 has a coil 203, an armature 205, magnets 207, and a yoke structure 209 for transferring magnetic flux which encompasses the magnets 207. The receiver 202 would be modified from traditional designs to enable bistable operation. This may be done via increasing the strength of the magnets 207, but may also involve reducing the mechanical stiffness. The receiver 202 has an extra opening 208, which is connected to the opening 210 in the rear volume of the microphone 212. The receiver 202 is designed so that in one position the receiver diaphragm or paddle 220 closes the air path between inlet and outlet. One method to do this is to add a gasket ring 218 inside the cover of the receiver that would touch the paddle 220. Another method would be to have the gasket ring 218 seal against the soft film annulus that surrounds the paddle 220. This use of a paddle to open or close the valve should not be limited to a balanced armature application, but may be utilized in other applications such as, for example, those described in FIGS. 16A, 16B and 17.

Embodiment 3

Movement of Ferrofluid

Figure 19:
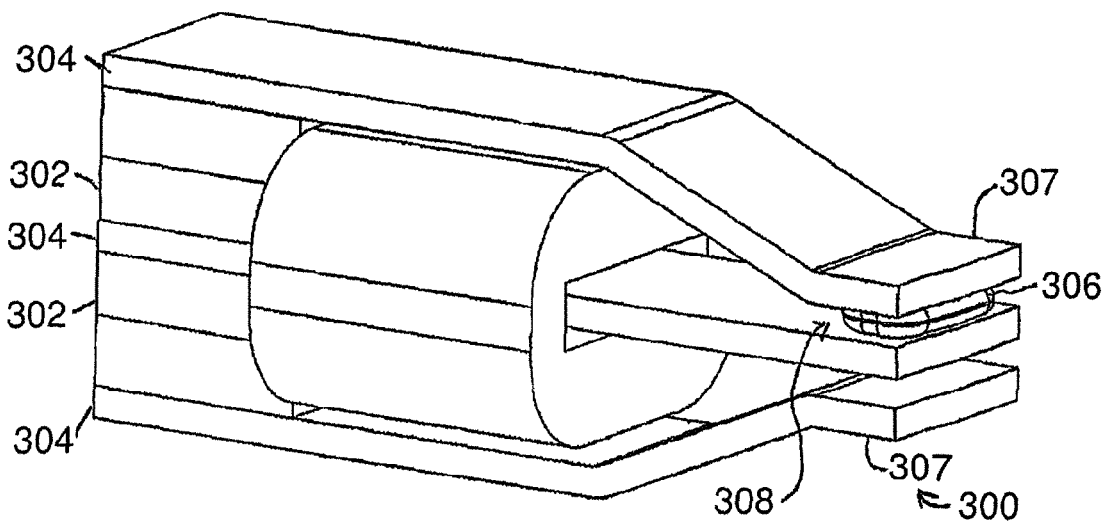
FIG. 19 is a perspective view of a moving fluid valve assembly in an embodiment of the present invention.
Figure 20:
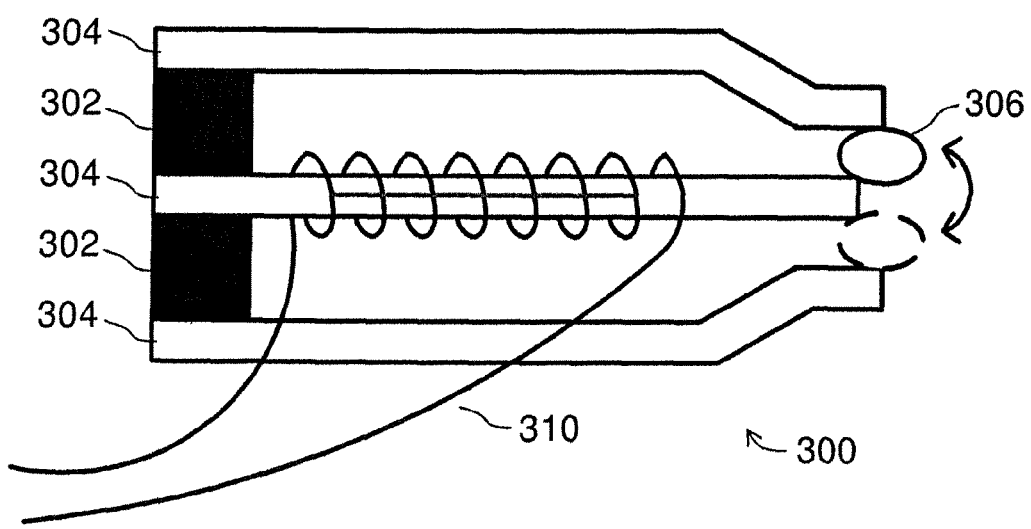
FIG. 20 is side cross-sectional view of the assembly of FIG. 19.

FIGS. 19 and 20 show the motor portion of a moving fluid valve assembly 300. The motor assembly 300 is constructed of two magnets 302 and 3 soft magnetic pole pieces 304. The field from the magnets 302 holds the fluid 306 in the gap 308 between two adjacent pole pieces 304. Magnetic flux from the magnets 302 flows through the pole pieces 304, creating a field in the small gap between tips 307 of the pole pieces 304.

When a pulse of current is applied to the coil 310, the field in one of the gaps 308 will be temporarily reduced, while the field in the opposing gap will be strengthened. A drop of ferrofluid 306 is attracted to the gaps, and is used to form a seal across the magnetic gap. When current flows through the coil 310, the magnetic field weakens in one gap, and strengthens in the other. The fluid 312 will move to the gap with the strongest field. When the current is removed, the fluid 306 will remain in place. Not shown is a housing. This housing is assembled around the magnetic system to create a path for sound from the rear volume of the microphone through one of the magnetic gaps. When ferrofluid 306 is in this gap, no sound may enter the rear of the microphone. This embodiment has an advantage in that the valve 300 may make little sound when in operation. This embodiment has no moving mechanical parts with the exception of the drop of fluid 312, so it may be robust against mechanical shock and contamination from dirt or ear wax.

Embodiment 4

Moving Magnet

Figure 21A:
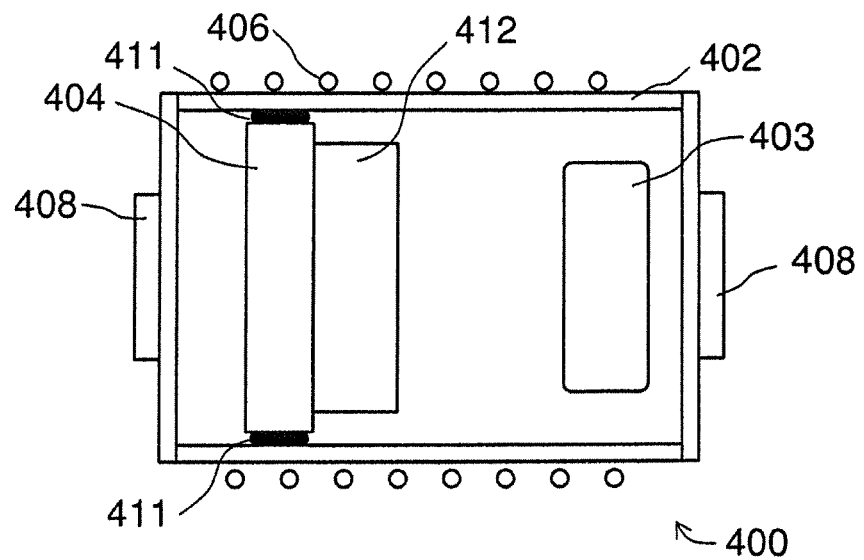
FIG. 21A is a side cross-sectional view of a moving magnet valve assembly in an embodiment of the present invention.
Figure 21B:
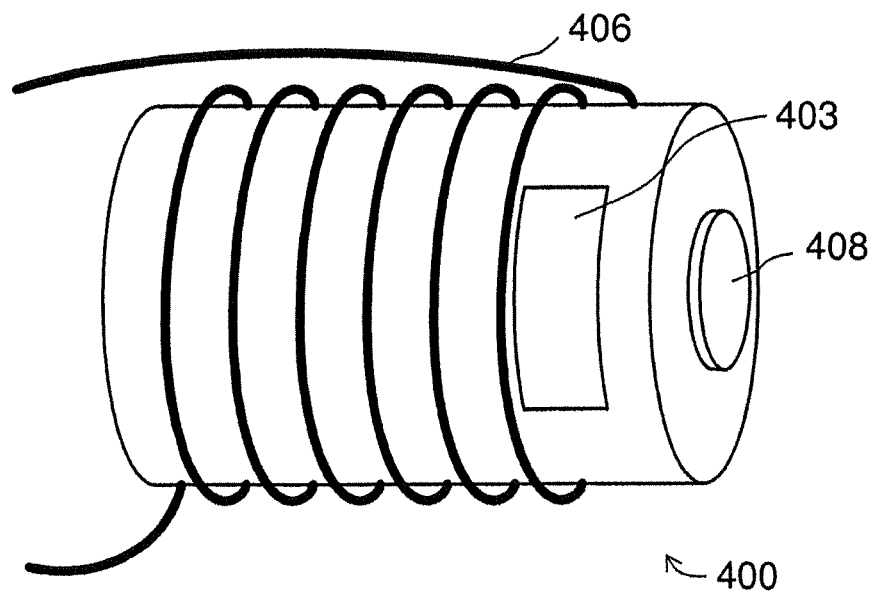
FIG. 21B is a side view of the assembly of FIG. 21A.

In an embodiment, shown in FIGS. 21A and 21B, an assembly 400 involves a small cylinder or housing 402 which is connected to a microphone. An outlet tied to the rear volume of the microphone is connected to the sound inlet 403 of the cylinder 402. Other shapes may also be used. The cylinder 402 is made of non-magnetic material. Inside the cylinder 402 is a small magnet 404, and outside the cylinder 402 is a coil 406 of wire. The magnet 404 may be a rare-earth magnet, such as Neodymium. An electrical current passing through the coil 406 will force the magnet 404 to move from one end of the cylinder 402 to the other. At each end of the cylinder 402 is a plate 408 made of ferrous material, such as steel. The plate 408 is placed so that the magnet 404 cannot contact the plate 408. This prevents the attractive force between plate 408 and magnet 404 from becoming too great for the force from the coil 406 to overcome. Another alternative would be to let the magnet 404 contact the plate 408, but manufacture the plate 408 to a size whereby the magnetic force of the coil 406 can still move the magnet 404. The arrangement of plates, coil, and magnet forms a bistable system. The circumference of the magnet 404 is coated with ferrofluid 411 to reduce friction between the magnet 404 and the case or cylinder 402. The magnetic field of the magnet 404 assures that the fluid 411 will stay near the magnet 404, and not leave the cylinder 402. When the magnet 404 moves towards the sound inlet 410, it closes the opening. A sleeve 412 may be attached to the end of the magnet 404 to help it close or cover the inlet 410. Not shown in the diagram is the location of the sound outlet, which is located on the opposite side of the cylinder 402, and is connected by a tube to, for instance, the face plate of a hearing aid.

Embodiment 5

Figure 22:
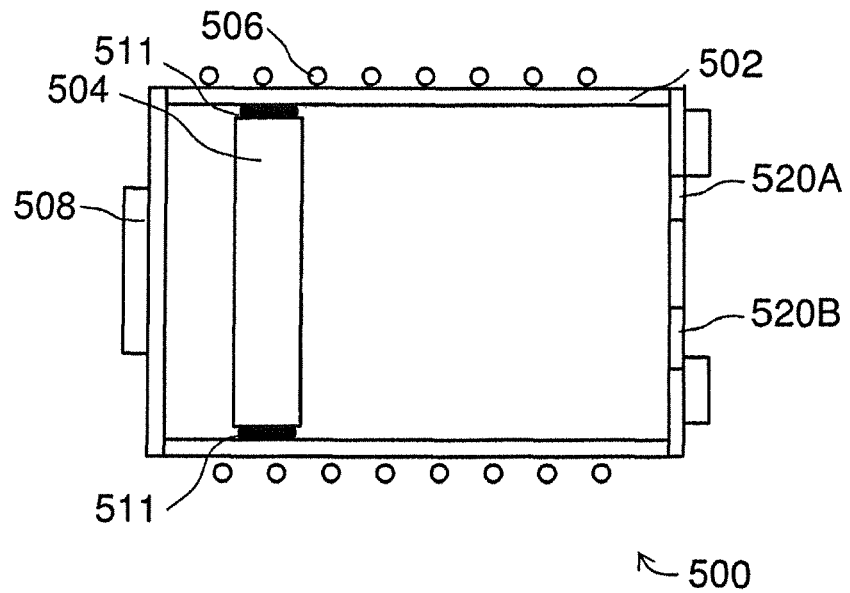
FIG. 22 is a side cross-sectional view of a moving magnet valve assembly in an embodiment of the present invention.

The primary elements are the same as those described in Embodiment 4 (see FIGS. 21A and 21B). The assembly 500 is similar in construction to the foregoing assembly 400 and like elements are identified with a like reference convention beginning from 500. However, in this assembly 500, the openings (inlet 520a and outlet 520b) 520 have been moved to the end of the case 502, as seen in FIG. 22. The flat surface of the magnet 504 closes off the inlet and outlet openings. The surface of the magnet 504 may be covered with a soft gasket material to aid in forming a seal. The steel material may be, for example, washer shaped to enable enough space for the inlet and outlet.

Embodiment 6

Figure 23:
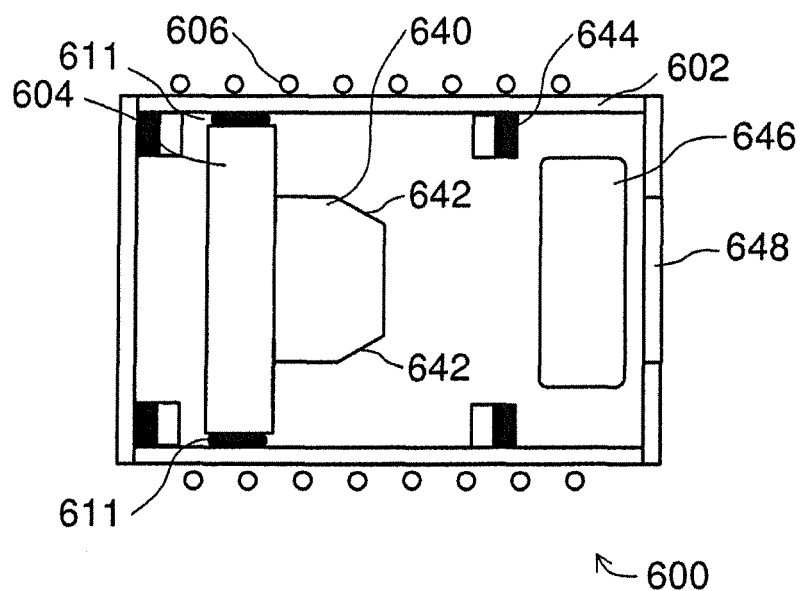
FIG. 23 is a side cross-sectional view of a moving magnet valve assembly in an embodiment of the present invention.

An assembly 600, illustrated in FIG. 23, is provided which is similar in construction as the assembly 500 and like elements are identified with a like reference convention beginning from 500. However, in this embodiment, a cone-shaped plunger 640 may be attached to the end of the magnet 604. Sloping edges 642 of the plunger 640 will improve the airtight seal when the valve assembly 600 is in a closed position. The positions of the inlet 646 and outlet 648 may be on either of the sides. In another embodiment (not shown), the positions of the inlet 646 and outlet 648 may be at the end of the cylinder 602. If, in another embodiment (not shown), both the inlet 646 and outlet 648 are on the sides of the cylinder 602, then the end of the cylinder 602 may be tapered to seal against the plunger 640. The position of the steel washer 644 near the inlet and outlet has been moved so that it can be near the magnet 604, regardless of the size of the plunger 640.

Embodiment 7

Moving Magnet

Figure 24:
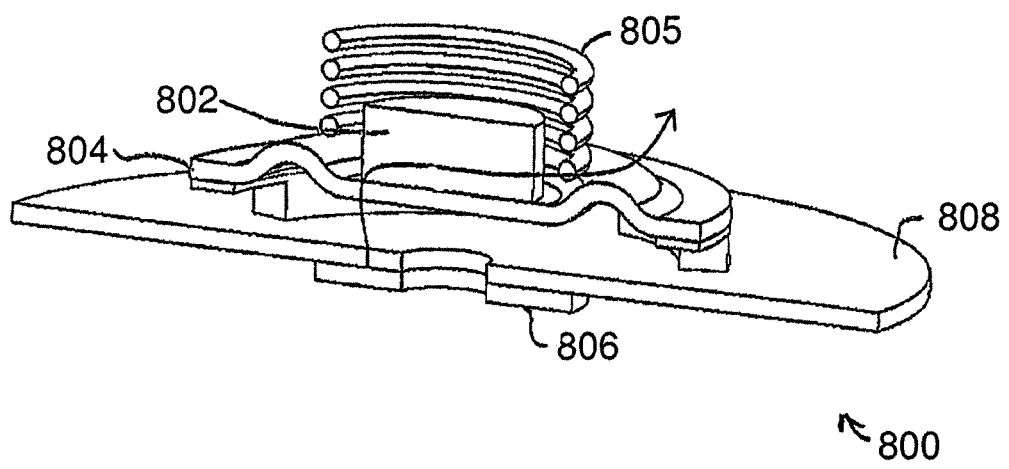
FIG. 24 is a perspective view of a magnetic valve assembly in which a moving magnet is attached to a film that acts as a spring.

FIG. 24 shows another moving magnet assembly 800. In this design, the magnet 802 is attached to a film 804 that acts as a spring to hold the valve assembly 800 in an open position. When a coil 805 is activated, the magnet 802 is forced near the pole piece 806. When the magnet 802 is close enough, the magnetic attraction will overtake the spring force and hold the valve assembly 800 in a closed position. The film 804 acts both as a spring, and as a sealing member for the valve assembly 800. FIG. 24 shows the valve assembly 800 mounted on a flat plate 808, which could be, for example, a cup wall of the microphone itself. The surface of the magnet 802 may be covered by a soft material to aid in forming a seal.

The valve assemblies described above can function in place of a second microphone in systems involving matched pairs of microphones. The valve assemblies may remove the need for closely matched pairs of microphones.

The valve assemblies described above can also be used to open or close a back-vent in a receiver. The low frequency output of a balanced armature receiver can be increased by opening a vent in the devices back-volume. The valve assemblies will allow one receiver to function with the same performance as two different receivers depending on the state of the valve. Areas of application for this feature include hearing-aids and audio earphones where different and distinct low frequency output levels are desired at different times.

In another embodiment, the present invention generally relates to a semiconductor device which may be constructed with two fixed electrodes separated by an air gap. Between the electrodes is a third free-floating electrode that can be polarized to either of the fixed electrode polarities to electrostatically deflect the free plate/electrode toward either of the fixed electrodes. The electrostatic attraction to either of the fixed electrodes opens or closes either of the acoustic paths through the semiconductor device.

Figure 25:
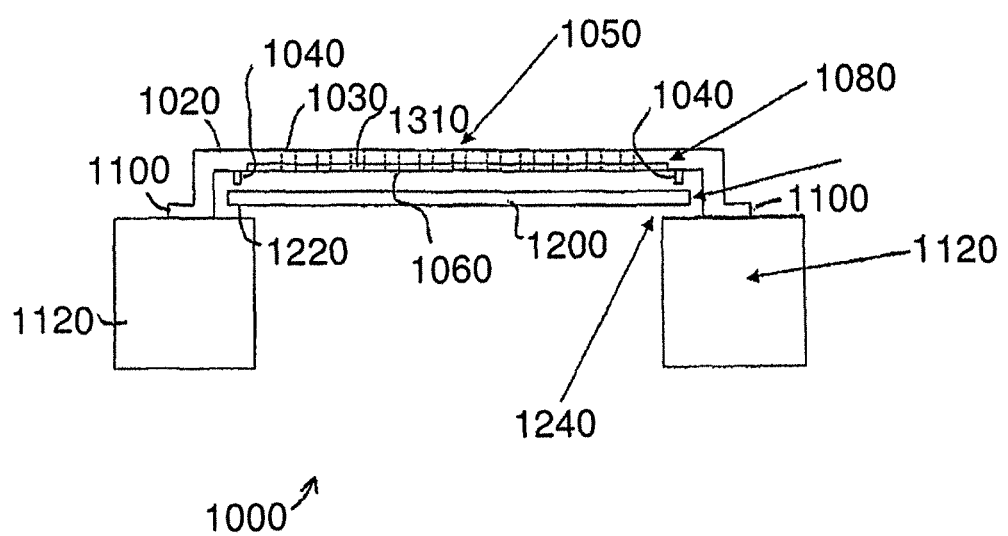
FIG. 25 is a cross-sectional view illustrating an acoustic switch mechanism according to the present invention.
Figure 26:
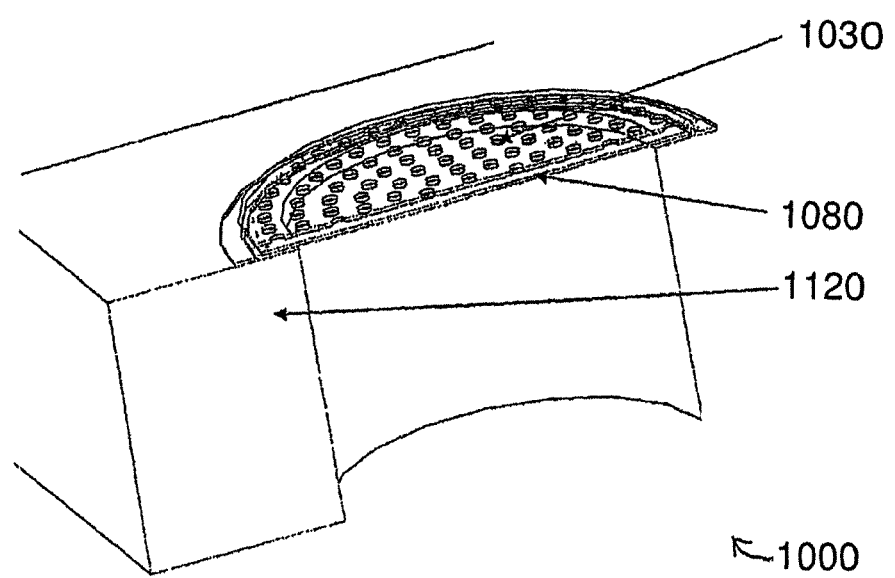
FIG. 26 is a perspective view of the acoustic switch mechanism of FIG. 25 according to the present invention.

Turning now to the drawings and referring now to FIG. 25, a cross-sectional view of an acoustic switch mechanism 1000 is described. The switch 1000 has a cover 1020 having holes 1030 which provide an acoustic path 1050. The network of holes 1030, seen in FIG. 26, allow an air path for sound to travel. An acoustic path is a path that allows a contiguous air pathway to allow acoustic wave propagation. For purposes of this specification this acoustic path will be referred to as a front acoustic path 1050. The front acoustic path 1050 allows sound to travel through the acoustic switch mechanism 1000 when the switch is open (to be explained in more detail below).

The cover 1020 may be constructed from, for example, Silicon Nitride, or like materials which produce the desired properties. The cover 1020 may be cylindrical in shape, though other shapes are also contemplated. The cover 1020 may have a diameter or length in a range from 300 um to 1000 um and may have a thickness in a range from 0.5 um to 5 um. Members 1040 may extend from a surface 1060 of the cover 1020. The members 1040 may have a length in a range from 1.0 um to 10 um.

A front electrode 1080 may be embedded within the cover 1020 via, for example, a semiconductor process such as CVD (Chemical Vapor Deposition.) The electrode 1080 may be constructed from, for example, Polycrystalline silicon, or like materials which produce the desired properties. The electrode 1080 may have a thickness in a range from 0.5 um to 1 um and may have a length or diameter in a range from 300 um to 1000 um. The front electrode 1080 may hold a charge in a range from 1V to 50V. The front electrode 1080 is a fixed, conductive electrode required to provide the electrostatic attraction or repulsion to a free floating electrode 1200 (which will be discussed below). An external polarizing voltage can be electrically applied to the electrode 1080. The members 1040 may enable a space to be created when the free floating electrode 1200 is disposed towards the front electrode 1080 as a result of a change in polarity caused by the external voltage.

The cover 1020 may have an outer perimeter portion 1100 which rests upon a rear electrode 1120. The rear electrode 1120 may have a diameter or length in a range from 500 um to 2000 um. The rear electrode 1120 may have a thickness in a range from 100 um to 1000 um and may be constructed from, for example, highly doped Silicon, or like materials which produce the desired properties. The rear electrode 1120 is a fixed, conductive electrode required to provide the electrostatic attraction or repulsion to the free floating electrode 1200. An external polarizing voltage can be electrically applied to the electrode 1120. The rear electrode 1120, in an embodiment, represents a conductive silicon substrate which overlaps the free floating electrode 1200 about its outside periphery.

The free floating electrode, or diaphragm, 1200 may be positioned on the rear electrode 1120. The free floating electrode 1200 may have a diameter in a range from 300 um to 1000 um. The radius is sufficient to enable a portion 1220 of the free floating electrode 1200 to extend beyond the inner radius of the rear electrode 1120. The free floating electrode 1200 is a mechanically actuated plate within the switch 1000. It is a conductive electrode which may have little to no mechanical restriction. An external polarizing voltage can be electrically applied to the electrode 1200. The free floating electrode 1200 has an external insulating layer to prevent shorting to either of the fixed electrodes. The insulating material may be, for example Silicon dioxide or like materials which produce the desired properties. In another embodiment, an insulating material may be applied to the front electrode 1080 and/or the rear electrode 1120.

When the switch mechanism 1000 is actuated, the free floating electrode 1200 is electrostatically forced to be in physical contact with the rear electrode 1120. The physical overlap between the rear electrode 1120 and the free floating electrode 1200 provides a restriction to the acoustic path through the device formed by holes 1310 in the front electrode, around the outside periphery of the free floating electrode, and through the rear electrode thereby closing the acoustic switch 1000, as indicated by arrow 1500 in FIGS. 28 and 29. A rear acoustic path 1240 allows sound to travel through the acoustic switch 1000 when the switch is open. The acoustic path 1240 may not exist when the switch 1000 is closed.

The acoustic switch mechanism 1000 has three terminals to provide application of a voltage to each of the three electrodes 1080, 1120, 1200. The source for the voltage may be, for example, a battery or a dedicated integrated circuit. By applying a polarizing voltage to the three electrodes 1080, 1120, 1200 in the correct order and polarity to generate electrostatic attraction and repulsion, the switch mechanism 1000 can be electrostatically opened or closed. Provided in FIG. 27 is a table of potential configurations. The "+" sign is defined as a higher potential voltage and the "−" sign is defined as a lower potential voltage level.

Figure 28:
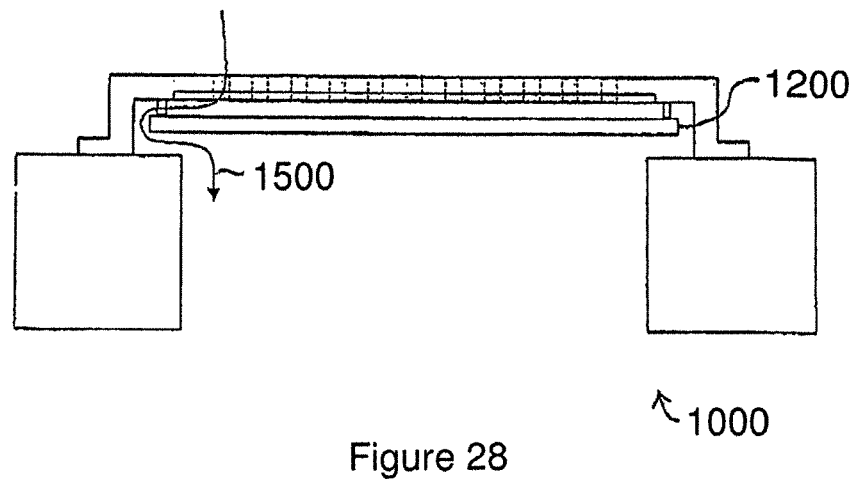
FIG. 28 is a cross-sectional view of the acoustic switch mechanism of FIG. 25 in an open position.
Figure 29:
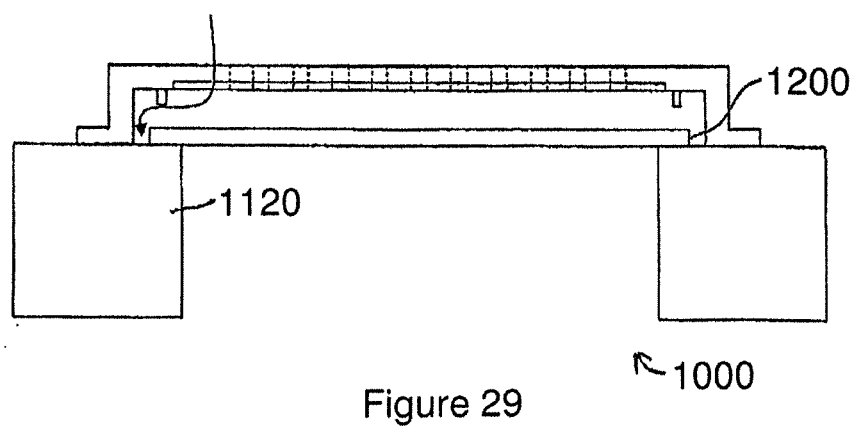
FIG. 29 is a cross-sectional view of the acoustic switch mechanism of FIG. 25 in a closed position.
Figure 31:
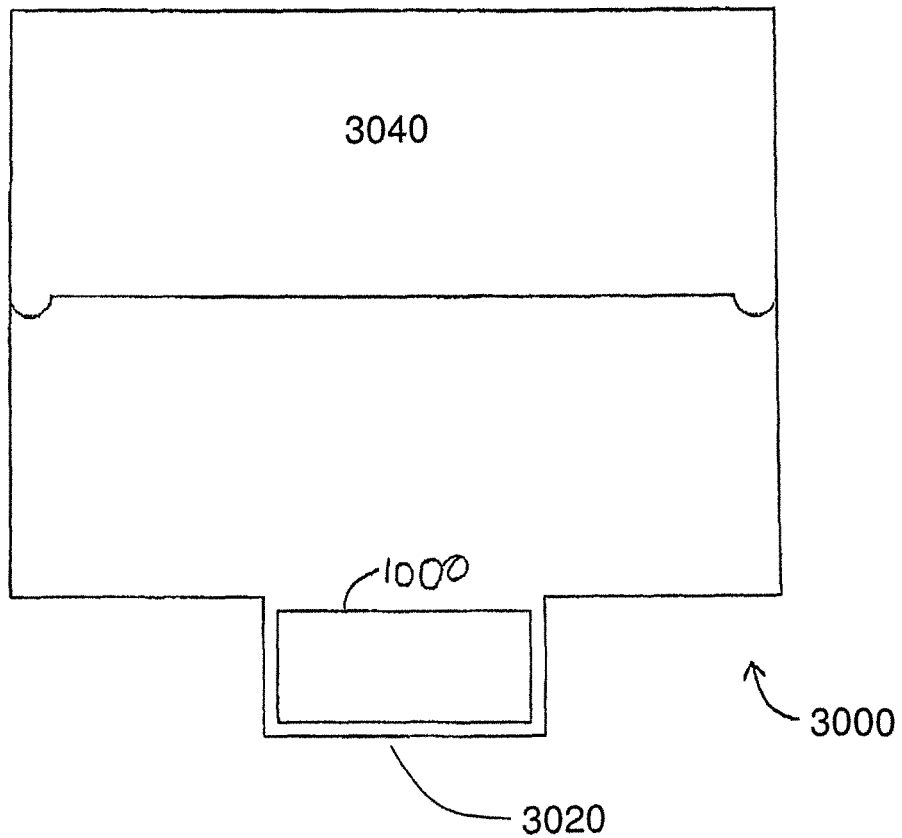
FIG. 31 illustrates a switch mechanism within a microphone device in an embodiment of the present invention.

Controlling the polarity of the floating electrode 1200 allows opening and closing of an acoustic pathway. FIG. 28 illustrates the switch mechanism 1000 in an open position configuration. FIG. 29 illustrates the switch in a closed configuration. FIG. 31 illustrates the switch mechanism 1000 within a microphone device 3000, such as, for example, an omni-directional hearing aid microphone. By closing or opening an acoustic port in a microphone, the user can actively turn the microphone OFF or ON without requiring a power-down and power-up cycle to achieve. With the acoustic switch in an OFF state, sound cannot propagate into the microphone to reach the transducer element, thereby rendering the microphone unable to transduce sound. This allows the user to quickly switch the microphone on and off without incurring, for example, potentially long electrical turn-on and settling times generally associated with electrical power-up cycles in electret microphones.

Figure 30:
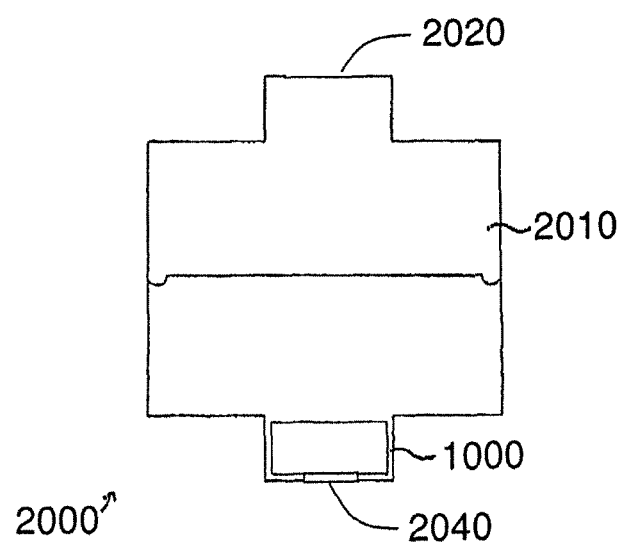
FIG. 30 illustrates an acoustic switch mechanism incorporated within a MEMS device according to the present invention.

By opening or closing an acoustic port in a dual-port directional microphone, the user can switch the functionality from an omni-directional functionality to directional functionality while utilizing only one microphone. A typical omni-directional microphone contains only one acoustic inlet port 3020 which allows sound to impinge upon one (front) side of an acoustic transducer 3040. In comparison, a typical directional, or a pressure differential microphone 2000 is one that contains two acoustic inlet ports 2020, 2040, each opening to opposite sides (front and rear) of a single acoustic transducer 2010, as illustrated in FIG. 30. One of the differences between an omni microphone and a directional microphone is the presence of a rear acoustic port. By placing an acoustic switch within the microphone, the rear port can be opened or closed electrostatically, switching the microphone functionality from omni to directional.

In a hearing aid worn in-the-ear, an acoustic switch can be constructed to reside in the vent path, allowing the hearing instrument circuitry to open or close the vent to enable additional features, such as higher gain or reduction in low-frequency background noise. A vent in a hearing aid is a tube which connects the inner ear canal cavity with the outside, ambient environment, used to reduce occlusion and improve patient comfort. In some embodiments, the negative implication of using a vent is that it reduces the available gain of the hearing aid due to a shorter acoustic path between the microphone outside of the ear and the speaker inside the ear canal.

By utilizing an acoustic switch, the acoustic vent can be closed in certain situations to allow use of higher gain.

By utilizing semiconductor technology, smaller functional devices can be created, enabling use in miniature microphones and hearing aids. Electrostatic activation allows acoustic switching with minimal current consumption, since electrostatic devices draw little to no current. This is extremely important in low current devices, such as miniature microphones and hearing aids. A floating electrode design for the switch mechanism allows contact area and open area to be maximized during switch close/open, enabling a good acoustic seal during switch closing and low air resistance in the acoustic path during an open state.

Preferred embodiments of this invention are described herein, including the best mode known to the inventors for carrying out the invention. It should be understood that the illustrated embodiments are exemplary only, and should not be taken as limiting the scope of the invention.

We claim:

1. A valve for an auditory system, the auditory system capable of converting between an acoustic signal and an electrical signal, wherein the valve has an acoustic pathway through which an acoustic signal may travel between a first point exterior to the auditory system and a second point interior to the auditory system, the valve comprising:
   a housing;
   a magnetic member located within the housing capable of generating a magnetic force;
   an armature adjacent to the magnetic member wherein the magnetic member generates a magnetic force towards the armature;
   a coil adjacent to the armature, wherein energizing of the coil attracts or repels the armature to substantially open or close the acoustic pathway and wherein the coil remains in a substantially fixed location relative to the housing and is not directly connected to the armature;
   such that the opening and closing of the acoustic passageway is effective to operate the valve in an open position or a closed position;
   wherein the open position allows already-produced sound to pass through the passageway without the sound being modulated; and
   wherein the closed position prevents the already-produced sound from passing through the passageway.

2. The valve of claim 1 further comprising:
   a spring member associated with the armature, wherein the spring member applies a force to the armature to open the acoustic pathway.

3. The valve of claim 1 further comprising:
   a diaphragm coupled to the armature and positioned between the armature and the exterior of the auditory system wherein movement of the diaphragm opens or closes the acoustic pathway.

* * * * *